US010657558B1

(12) United States Patent
Lindsay et al.

(10) Patent No.: US 10,657,558 B1
(45) Date of Patent: May 19, 2020

(54) SYSTEM AND METHOD FOR USING A PLURALITY OF DIFFERENT DATA SOURCES TO CONTROL DISPLAYED CONTENT

(71) Applicant: Mather Economics, LLC, Atlanta, GA (US)

(72) Inventors: Paul Mather Lindsay, Atlanta, GA (US); Douglas A. Scher, Boca Raton, FL (US); Charles Currin, Marietta, GA (US); Arvid Tchivzhel, Sandy Springs, GA (US); Kenneth E. Irwin, Jr., Dawsonville, GA (US)

(73) Assignee: Mather Economics, LLC, Atlanta, GA (US)

( * ) Notice: Subject to any disclaimer, the term of this patent is extended or adjusted under 35 U.S.C. 154(b) by 70 days.

(21) Appl. No.: 15/596,775

(22) Filed: May 16, 2017

(51) Int. Cl.
*G06Q 30/02* (2012.01)

(52) U.S. Cl.
CPC ..... *G06Q 30/0254* (2013.01); *G06Q 30/0277* (2013.01)

(58) Field of Classification Search
None
See application file for complete search history.

(56) References Cited

U.S. PATENT DOCUMENTS

| 9,043,942 B1* | 5/2015 | Birdwell Rockson ........................ G06F 21/60 726/28 |
| 9,691,080 B1* | 6/2017 | Torrance ............ G06Q 30/0246 |
| 2006/0293957 A1 | 12/2006 | Petersen et al. |
| 2011/0166927 A1 | 7/2011 | Bandi et al. |
| 2011/0314114 A1 | 12/2011 | Young, III et al. |
| 2013/0159081 A1* | 6/2013 | Shastry .............. G06Q 30/0274 705/14.23 |
| 2014/0122684 A1 | 5/2014 | Brentano et al. |
| 2015/0236925 A1* | 8/2015 | Bodz ....................... H04L 41/50 709/203 |
| 2016/0086215 A1* | 3/2016 | Wang ................. G06Q 30/0246 705/14.45 |
| 2016/0300265 A1* | 10/2016 | Goyal ................ G06Q 30/0257 |
| 2018/0047048 A1* | 2/2018 | Mielechowicz ... G06Q 30/0243 |
| 2018/0089652 A1* | 3/2018 | Hiranandani ........ G06Q 20/405 |

OTHER PUBLICATIONS

"IE10 and IE11 Cookies and History Persistence in roaming/Citrix Situations—the last word on managing you WebCache" published online at https://www.htguk.com/ie10-and-ie11-cookies-and-history-persistence-in-roamingcitrix-situations-the-last-word/ on Nov. 24, 2016) (Year: 2016).*

* cited by examiner

*Primary Examiner* — James M Detweiler
(74) *Attorney, Agent, or Firm* — Panitch Schwarze Belisario & Nadel LLP

(57) ABSTRACT

A first set of electronic information is logged to a remotely located data store, including a user identifier, primary content, secondary content, and user interaction with the primary content and the secondary content. A second set of electronic information is received from a data source other than the user device, the second set of electronic information being related to the same user identifier as the user identifier of the first set of electronic information. Behavioral data is created for the user identifier based on at least the logged first set of electronic information and the second set of electronic information. A subsequently displayed container is controlled or modified based on the behavioral data.

16 Claims, 10 Drawing Sheets

320

321  322  323  324  325  326

| # | Segment | Type | Tag | Meter Limit | Reset Meter |
|---|---------|------|-----|-------------|-------------|
| 1 | NEWS6_NO NSUB | script | https://www.wsj.com/articles/snap-goes-the-market-1488413442 | 0 | 0 |
| 2 | COWBOYS3 _NONSUB | script | https://i.simpli.fi/dpx.js?cid=58786&action=100 &segment=tbtsimplifione&m=1&sifi_tuid=32395 | 0x1FE 42 | 1 |

```
{
351  "doc": {
352    "duid": "beflaf8ee68a4a63",
353    "segments": [{
354      "name": "COWBOYS3_NONSUB",
355      "type": "script",
       "tag":
       https://i.simpli.fi/dpx.js?cid=58786&action=100&segment=tbtsimplifione
       &m=1&sifi_tuid=32395
356    }],
       "updateTS": "1479697294"
357  },
       "muid": "76f2f444-e20b-486d-858a-644521be6231"
}]
}
```

FIG. 3C

```
375
 ↘
  {
      "userDB": {
376 ↘    "uid": "7637519",           380
382 ↘   "pageViews": "49",            381
383 ↘   "duid": "beflaf8ee68a4a63",
        "updateTS": "1476469118",
        "segments": [{                384
385 ↘    "name": " COWBOYS3_NONSUB",
         "type": "script",
386      "tag":
  ↘ https://i.sim
    ifione&m=1&sifi_tuid=32395
        },
        {                             387
         "name": "SPORTS6_NONSUB",
         "type": "script",
388      "tag":
  ↘ https://i.simpli.fi/dpx.js?cid=58786&action=100&segment=tbtsimpl
    ifitwo&m=1&sifi_tuid=32397
                                                389
377 ↘   }],
378 ↘   "muid": "76f2f444-e20b-486d-858a-644521be6231",
379 ↘   "nextUpdate": "1800000",
        "nextUpdateTS": "1485202964826",
        "userDBFetch": "1"
      }
   }
 }
```

FIG. 3D

START

↓ log a first set of electronic information to a remotely located data store, including a user identifier, primary content, secondary content, and user interaction with the primary content and the secondary content (701)

↓ receive a second set of electronic information from a data source other than the user device, the second set of electronic information being related to the same user identifier as the user identifier of the first set of electronic information (702)

↓ create behavioral data for the user identifier based on at least the logged first set of electronic information and the second set of electronic information (703)

↓ control or modify a subsequently displayed container based on the behavioral data (704)

↓

END

FIG. 7

SYSTEM AND METHOD FOR USING A PLURALITY OF DIFFERENT DATA SOURCES TO CONTROL DISPLAYED CONTENT

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

The present invention relates to a customizable mechanism for processing analytical metrics and events that are collected from web sites, mobile devices, and other sources. Specifically, this innovation resolves the problem of efficiently and timely generating conclusions based on overall summation and reduction of data including obsolesce purging from multiple sources. Caching efficiencies are realized using a synchronized time clock and common user identification during the data summation and reduction process. Offline batch reports are also obtained separately and linked to supplement collection software data, particularly with "Customer Lifetime Value" (CLV). Additionally, specific consumer data is reduced to a set of segment attributes and behavior metrics that can be used to analyze general overall behavior or, alternatively, generate specific treatment for individual consumers both in online and real world environments.

2. Background

Mass marketing has gone through a renaissance with the proliferation of new media. Television, radio, and newspaper advertisements as well as coupon mailings have been effective at reaching millions, but do not offer the best engagement with the consumer. Technological advancements (e.g., mobile devices, the Internet of things) tend to pinpoint the exact moments and needs of consumers (e.g., location, retail searches, concerns) to supply consumers with the solutions they are looking for at any given moment. Arguably, with recent developments in connected and mobile devices, advertising and sales will progress more in the next few years than it has in the past sixty years.

One current trend is for advertising to become more instantaneous both in terms of how the advertiser contacts the consumer and how the consumer purchases products and services. This is the generally accepted trend that high technology companies like Google®, Yahoo®, Bing®, Apple®, and the like are endeavoring to exploit. However, this trend simply tends to insert a mass-market brand or advertising campaign into the moment automatically triggered by the consumer's actions or location without any consideration for historical data both in terms of the individual consumer as well as the collective. Thus, little benefit or feedback is gained from cumulative consumer experience. The result being limiting the level of consumer's instantaneous engagement with a "one size fits all" advertising or sales campaign simply inserted into the consumer's experience in an opportune time. Additionally, this technology often has the unfortunate consequence of "sticky" advertising where the instantaneous advertisements persist long after the consumer's moment of interest has expired. Thus, rather than advertising or attempting sales in the moment, the consumer is repeatedly bombarded with out-of-date information, which can become annoying and ultimately impact sales. Furthermore, there are numerous versions and editions of "ad blocking" software (e.g., AdBlock Plus™—ABP™, AdFender™, Emma Ad Blocker™) that effectively screen the consumer from advertisements, thereby impairing potential advertising revenue as well as making it difficult for the site to determine a true Customer Lifetime Value (CLV) of its consumers.

A better approach is to enable marketing campaigns, pricing, and online offerings to be tailored by cumulative experience using knowledge accumulated over multiplicities of consumer interactions as well as individual consumers. However, problems associated with accumulating knowledge from multiple sources and consumers grow almost exponentially with the amount of knowledge accumulated with typically high bandwidth requirements as well as obsolete data creating false conclusions. Thus, incorporating this cumulative level of feedback into applications has proven to be prohibitively expensive (both in terms of cost and bandwidth) and troublesome with overall conclusions frequently questioned. Amassing such dissimulated knowledge processing into a common database much less disseminate it into modifying a particular consumer's experience has, so far, proven to be a technically vexing problem at best.

For example, U.S. Published Patent Application No. 2006/0293957 (Petersen et al.) discloses the concept of " . . . tracking and publishing categorical user interest data, based on computer user behavior observed by a server . . . " (Abstract, first sentence), but ultimately categorizes such data via content site subject category and sponsorship status, archiving the categorizations in the form of historical cookies stored on the user's computer. Thus, only rudimentary categorization and segmentation is achieved with the archival history maintained in the distributed multiplicities of user computers. While somewhat helpful for Internet advertising displays, the elementary categories maintained by the '957 application's disclosed methods inherently prohibit detailed analytical analysis necessary for more detailed advertising and sales—e.g., dynamic pricing, access to free web views. Additionally, the distributed storage method of the '957 application inherently prohibits any possibility of cumulative analysis of consumer behavior.

U.S. Published Patent Application No. 2011/0166927 (Bandi et al.) teaches an example that centralizes feedback in terms of Click Through Rate (CTR) that is then used as an analytic to determine advertiser price per impression. However, the '927 application only addresses the brute force analysis of CTR and consequently fails to provide any analysis of consumer behavior or preferences other than CTR and therefore fails to amass knowledge in a central database except simple popularity.

Another example is provided U.S. Published Patent Application No. 2011/0314114 (Young, III et al.), which discloses using the consumer computer's cookies as unique persistent identifiers flagged to a central system thereby enabling potential cross channel identity resolution and tracking. Though, the '114 application only attempts to identify a common consumer or user across multiple channels and does not attempt to collect, correlate, or analyze the consumer or user's specific behavior across these multiple channels.

Yet another example is provided by U.S. Published Patent Application No. 2014/0122684 (Brentano et al.) disclosing aggregating consumer or user behavior data on a central system using non-Personally Identifiable Information (non-PII). The ultimate goal being that subsequent consumer visits to participating third party Internet sites would have a customized experience without requiring any authentication directly from the consumer. However, the '684 application's disclosed invention primarily relies on central servers thereby introducing bandwidth overhead and corresponding inherent latency in the consumer's experience. Additionally, the '684 application is concerned primarily with utilizing accumulated non-PII formatted consumer data to modify the interactive experience (e.g., which advertisements are shown) in a real time or near real time basis and does not envision any data mining, paywall pricing, or back office analysis of any accumulated data.

Thus, it is highly desirable to develop new mechanisms for processing analytical metrics using distributed homogeneous database(s) structured around cumulative consumer actions. Ideally, these mechanisms should be extremely efficient, operating both in real time and batch processing, not burden normal operations, provide real time price controls, and include built-in obsolescence purging.

SUMMARY OF THE INVENTION

Objects and advantages of the invention will be set forth in part in the following description, or may be obvious from the description, or may be learned through practice of the invention.

In accordance with aspects of the invention, online consumer actions are reduced to a set of segment attributes and behavior metrics that are specific to unique users while providing a general foundation for cumulative consumer behavior analysis. Ideally, this accumulated knowledge could provide customized Internet experiences as well as real world goods and services thereby providing optimal consumer engagement and sales. Examples of enabled customized Internet experiences include: (a) targeting advertisements to a specific consumer; (b) controlling the amount of free content available to a consumer—i.e., dynamic metering; (c) improving existing CLV—"Customer Lifetime Value"; (d) targeted pricing applications; (e) customer specific pricing recommendations or ranges; and (f) reducing the problem of "sticky" advertising. Examples of enabled customized real world goods and services are: (a) newspaper or magazine subscription pricing; (b) customized newspaper or magazine content; (c) customized travel package offerings; and (d) elective surgery pricing—e.g., plastic surgery, teeth whitening.

One broad aspect of this invention is collecting and maintaining data at specific caching levels thereby segregating consumer data to be randomly accessible in a timely manner at both the individual consumer level as well as global cumulative analysis. The collected and maintained consumer data also being archived with a cumulative large database that is kept up-to-date when fresh data becomes available as well as automatically culled of obsolete data over time. This cumulative large database is subsequently filtered and pushed down to series of related databases and caches distributed throughout the system for optimal bandwidth utilization and responsiveness.

Under this broad aspect, user data is collected, preferably by JavaScript code running on a browser. This collected data is sent to a server (a.k.a. "Collector"), which reformats and cleanses said data prior to inserting it into a cumulative large "Master Event" database. Periodically, batch programs run sorting and reducing the Master Event database into user specific records copied into a downstream "User" database. In addition to reducing events on the Master Event database into User database records, periodic batch programs also acquire ancillary sourced data (e.g., consumer subscription information) merging and/or further filtering the Master Event and downstream User databases. Batch processes also review previously archived data for current relevancy (e.g., determining whether the archived data is still being referenced) periodically purging obsolete data. In addition to processing of upstream system global databases, batch processes can also execute locally on user's browser's cache providing virtually instantaneous analysis of dynamic situations (e.g., pay wall fees, advertising content) as well as determining if newly accumulated data should be archived locally or pushed up to the Collector immediately. Finally, batch processes can be utilized to redact or obfuscate consumer identifier data—e.g., consumer credit card number "X"ed out.

Also under the broad aspect, the Master Event database is organized via: system assigned, unique user identification records (a.k.a. "Master User Identification", or "Muid" records), and providing user segmentation of behavioral data that can optionally be utilized to protect user anonymity. In this optional embodiment, Muid records can be crossed referenced with anonymous tracking cookie values—"Data Unit Identifier(s)" or "Duid(s)"—as well as hard user identification values ("User Identification" or "Uid"—e.g., account login information) to enable batch processes to link multiple Duid and possible Uid values to a common Muid record in the global Master Event database. The Uid and portions of the Duid (e.g., Internet Protocol or "IP" address) being optionally purged or obfuscated after the relevant data has been merged into the common Muid record.

In another broad aspect of the invention, synchronized time clock tagging is included in the Master Event and other associated databases and caches. This synchronized time clock tagging provides a benchmark for automatically purging extant data from multiplicities of associated databases and caches. The purging of extant data thereby achieving processing efficiencies previously not realized. In addition to enabling automatic purging of extant data, synchronized time clock tagging also enables scheduled uploads of local cache user data to the global Master Event database at periodic or a priori specified intervals.

Under this broad aspect, whenever the global Master Event database is updated, associated downstream high-speed databases and caches are synchronized with subsets or abstractions of the Master Event database. Previous unknown efficiencies are then realized with the associated high-speed databases and caches offering streamlined low latency and timely data access to multiplicities of user browsers.

In a preferred embodiment, user browser access to a remote common, DynamoDB cache (which, in turn is synchronized to the upstream User database that is, in turn, synchronized to the Master Event database) is reduced by locally caching the user's specific Muid record in the user's browser's non-volatile memory further reducing bandwidth requirements as well as latency times. In this embodiment, whenever a user's browser accesses the DynamoDB cache, a value is returned indicating the next time the DynamoDB cache will be updated based on a priori batch processing schedules. The local cache then fulfills future browser requests within its capabilities until the a priori batch processing schedule date expires or a specified event occurs that mandates a connection with the DynamoDB cache or collector server.

With this preferred embodiment, the browser local code (e.g., JavaScript) utilizes the downloaded local cache to make real time decisions by combining local cache with newer browser data collected after the last local update from the DynamoDB cache. As part of this process, portions of locally collected new browser data that are relevant to the Collector and subsequent Master Event database are automatically uploaded as a background process. This embodiment is particularly useful in mitigating the problems of "sticky" advertising and access control for low volume consumers as well as substantially lowering the typically high costs of managing customer-level data for real time processing.

In, yet another preferred embodiment, the synchronization of multiplicities of high-speed databases and caches with subsets or abstractions of the common Master Event database and Muid enable information exchange and summations from multiple Internet sites to congealed conclusions that would not have been possible with prior art cookie and tracking paradigms. For example, multiplicities of visits to different sites where the user has a common Muid recognized on each site and the user has viewed zero advertisements strongly implies that the user is utilizing some form of "ad blocker" software that eliminates advertisements from the user's experience. While this may be desirable for the user's viewing experience, as a consequence it reduces the user's value to the Internet site and consequentially his or hers' CLV resulting in potentially restricted access to premium offerings.

In addition to online (i.e., Internet) processing and decision making, the distributed nature of the multiple database and caches of this invention also enables batch processing of the global database(s) to generate offline reports for use in both virtual (i.e., Internet) and real world (i.e., brick and mortar) transactions. These offline reports may be useful in determining metered access rates or advertising placement in Internet environments as well as subscription rates (e.g., newspapers, magazines), product discounts, etc. in real world physical environments.

Described are a number of computing mechanisms for collecting and analyzing consumer attributes and behavior metrics in global and individual spheres of interaction.

BRIEF DESCRIPTION OF THE DRAWINGS

Preferred embodiments of the present invention will now be described by way of example with reference to the accompanying drawings:

FIG. 3B is a first represent two-dimensional graphic illustration of the table structure of the CSV (Comma-Separated Values) User database file exported to the DynamoDB in FIG. 3A.

FIG. 3C is an exemplary view of a first representative example of the Muid user record snippet that is fetched by the web browser of FIG. 3A.

FIG. 3D is an exemplary view of a first representative example of HTML5 (Hyper Text Markup Language, version 5) snippet of local cache storage that is fetched by the web browser of FIG. 3A.

FIG. 7 is a flowchart in accordance with one preferred embodiment of the present invention.

DETAILED DESCRIPTION OF THE INVENTION

Figure 1A:
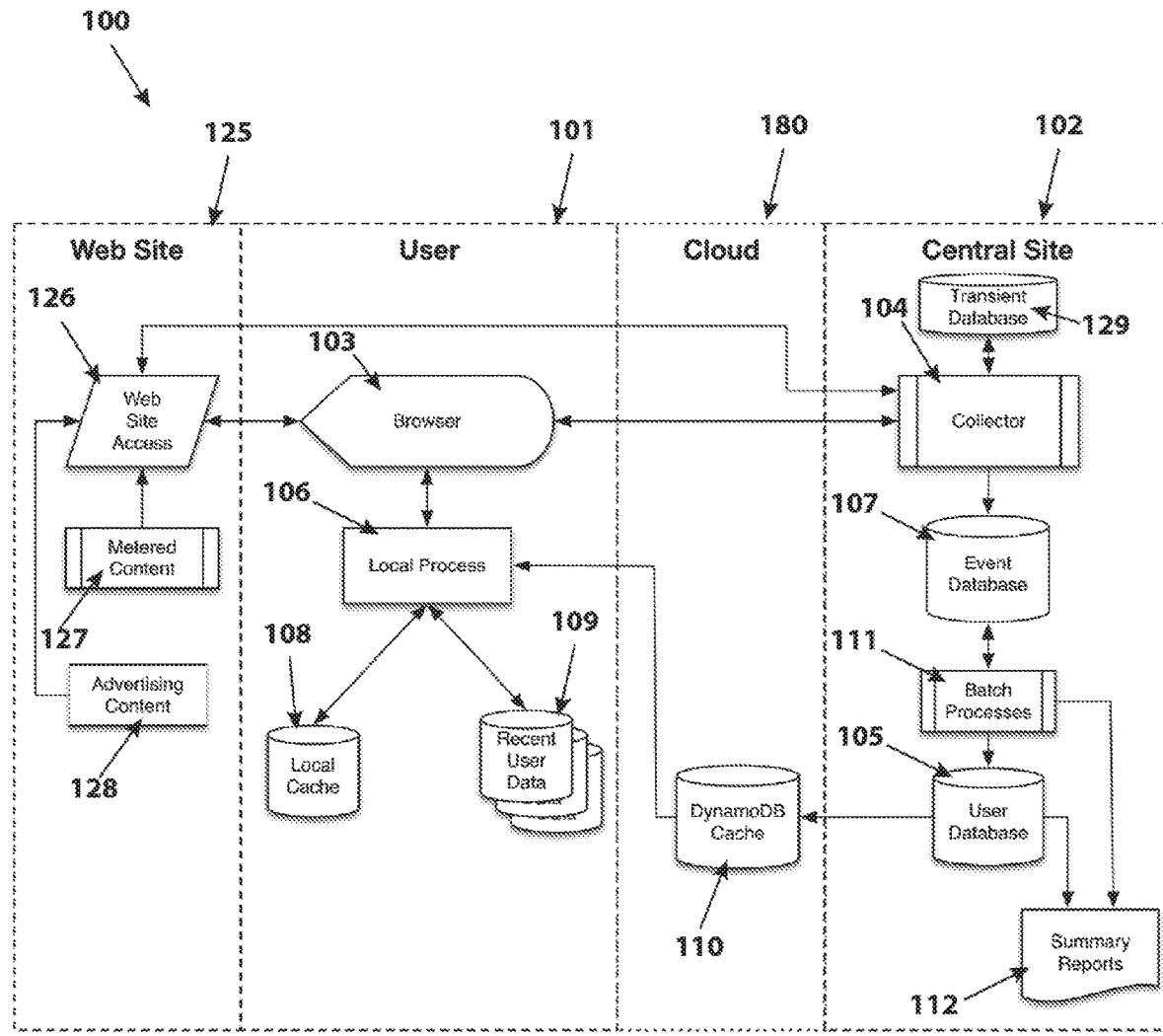
FIG. 1A is a swim lane flowchart representative example of the general embodiment with segregated databases and caches.

Certain terminology is used herein for convenience only and is not to be taken as a limitation on the present invention. The words "a" and "an", as used in the claims and in the corresponding portions of the specification, mean "at least one." In the context of this invention, the "Collector" refers to the server that receives user data from browsers; reformatting and cleansing said data prior to inserting it into a database maintained at the central site. The "Master Event" database is the global central site database that receives data input from the Collector as well as serves as the central depository for generating all system cache files as well as the downstream database(s) used for all batch processing. Batch processing is used (among other purposes) to sort, filter, obfuscate, and reduce the Master Event database into user specific records that are maintained in a separate, downstream, central site "User" database. The "DynamoDB" cache is effectively a cloud-based cache that receives spontaneous and periodic updates from the central site User database. The DynamoDB cache functioning as the main depository and point of contact for all user browser local cache updates.

"User device" refers to the computational device (e.g., laptop computer, smart phone, iPad) controlled by the user that interacts with the elements of the present invention. When the user device accesses an Internet or web site supported by the present invention, "primary content" is downloaded to the "user device" from the "content provider" that typically embodies the information sought by the user (e.g., newspaper article, video). In concordance with the download of the primary content, "secondary content" is also transferred to the user device from the Internet or web site. The secondary content typically is advertisements or offers that were not necessarily sought after by the user initial query to the Internet site.

"Master User Identification" or "Muid" records refer to the unique user identifier that organizes the central site Master Event database as well as all downstream multiple caches and databases such that user segmentation and behavioral data can be readily accessed throughout the system,—optionally preserving anonymity of the user. Conceptually, the Muid can be viewed as a form of "device graph," also known as "identity management,"—i.e., a mapping tool that links an individual to all the devices they use, which could be a person's computer at work, laptop at home, tablet, and smartphone. Thus, instead of counting each device and possible different site visit as the behavior of a different person, the Muid counts them as one person, so there's no duplication. In the context of this invention, the Muid is typically a deterministic "device graph" using principally an "Uid" and/or "Duid" to initially identify the user with all subsequent interactions flagged by the unique Muid. A local browser tracking "Domain Unique Identifier" or "Duid" is an anonymous tracking cookie value that conveys information about the user's online actions without necessarily compromising the user's identity, whereas the local browser User Identification or "Uid" refers to specific hard user identification values (e.g., user login) that specifically identify the user.

Also, in the context of this invention, "primary content" refers to the main or native content offered by an Internet site being accessed by the user—e.g., newspaper or magazine article, news content. "Secondary content" refers to content (e.g., Internet advertising) provided by another entity, typically hosted on another server. Both primer and secondary content are displayed in "containers" that portray the information (usually in a visual format) to the user. The "data store" is associated with a remotely located server (i.e., remotely located relative to the user) and contains multiplicities of data sources that can be selectively displayed to the user's container with the selective data usually being determined by the cumulative "data" derived from the user's Muid and possibly CLV that are essentially a global, long term, compilation of user-generated actions or accumulated behavioral data. The "data store" may be one discrete element or a plurality of interconnected elements.

Managing access, improving existing "Customer Lifetime Value" or "CLV", implementing market pricing, enhancing caching efficiencies, determining user preferences, and reducing "sticky" advertising while enhancing the responsiveness and efficiency of the system in an economically viable fashion requires multiple data depositories, segmentation, synchronized release of information, and coordination. By dividing data archival functionality across multiplicities of databases and caches distributed throughout the system the various databases and caches can be fine-tuned and optimized for their respective tasks thereby enabling greater efficiency and reduced system latency than has been previously not realized. Segregating the central site Master Event and User databases from the cloud based DynamoDB and user browser local caches allows for ready compartmentalizing of data storage for efficiency and security (e.g., user anonymity protection) as well as synchronized and timely updates. Augmenting central site Master Event and User databases as well as multiplicities of distributed caches with user browser derived metrics as well as optionally third party data allows for continuously updated automatic content, pricing, and access decision processing. These updated decisions can be applied to batch processing for determining content and pricing of both online (e.g., targeted advertising pricing) and brick and mortar products (e.g., physical newspaper and magazine subscriptions). Additionally, real time decision processing can also be enabled thereby supporting metering of access as well as controlling gateways to up-to-date advertising content.

Synchronized system-level division of data storage, segregation, and augmentation of digital databases and caches while, at the same time, enabling batch processing of a global database has not been attempted with traditional Internet web sites. Because of the limited capacity of traditional cookies or central site databases to maintain up-to-date information from multiplicities of sources, heuristic control of page limit views has previously been problematic at best. This same limited capacity contributes to advertising "stickiness" commonly observed by Internet web shoppers where an advertisement for a searched item continually pops up long after the item has been procured via a separate web site. Thus, with this invention enhanced customized Internet experiences can be realized, including: better and more timely targeting of advertisements to a specific consumer, dynamic metering, improving existing CLV, enhancing caching efficiencies, improved determining of user preferences, and implementing dynamic market based pricing.

Reference will now be made to one or more embodiments of the system and methodology of the invention as illustrated in the figures. It should be appreciated that each embodiment is presented by way of explanation of aspects of the invention, and is not meant as a limitation of the invention. For example, features illustrated or described as part of one embodiment may be used with another embodiment to yield still a further embodiment. This invention includes these and other modifications that come within the scope and spirit of the invention.

Figure 1B:
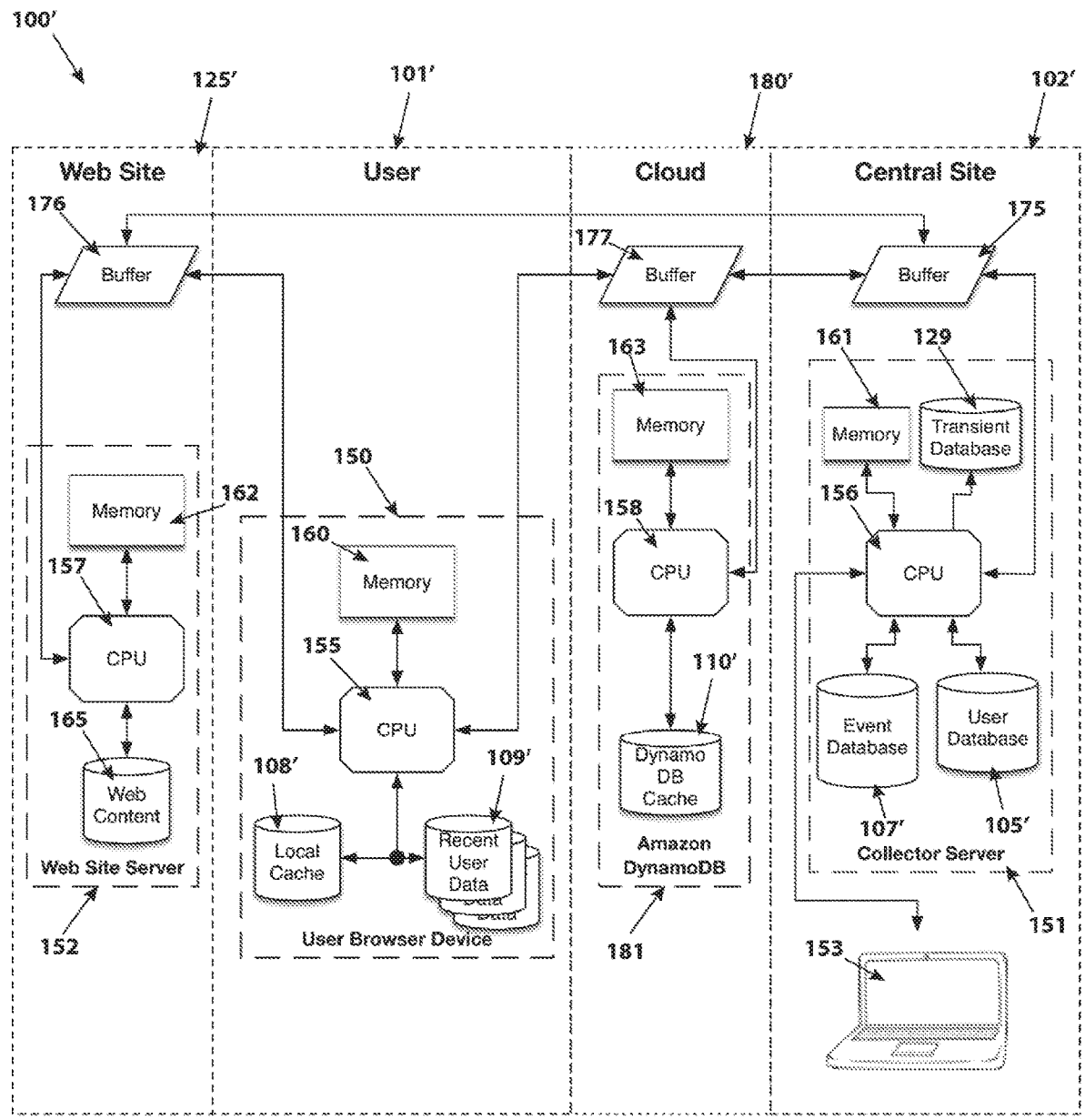
FIG. 1B is a system architecture diagram corresponding to FIG. 1A.

FIGS. 1A and 1B, taken together, illustrate the general embodiment 100 of the invention, which seamlessly integrates separate local cache, recently collected browser data, the DynamoDB cache, and central site Master Event and User database portions with a common Muid code and synchronized time clock tagging. FIG. 1A depicts a swim lane flowchart providing a schematic graphical overview of a general embodiment of the invention. As illustrated in FIG. 1A embodiment 100, system-level division of data storage, segregation, and augmentation of digital databases is conceptually divided into four groups (i.e., web site 125, user 101, cloud 180, and central site 102) by the four "swim lane" columns from left to right. Whichever "swim lane" a flowchart function appears within its functionality is limited to the data category of the associated swim lane—e.g., Internet browser 103 is within the segregated domain of user 101.

As illustrated in FIG. 1A, the process of multiple database creation, segregation, and synchronization begins with assigning a unique Muid value to a user the first time he or she directs their browser 103 to connect to a web site 125 supported by the invention. This assignment process involves first hyperlinking and downloading a process 106 from the Collector 104 to the browser 103 comprising computer code that will execute locally on the user device or browser 103 with its own unique Muid value assigned by the central site 102 Collector 104. In a preferred embodiment, this downloaded process 106 or computer code would be JavaScript providing direct interaction with both the web site 125 as well as the Collector 104. Regardless of the language of the local process 106 downloaded to browser 103, the local process 106 maintains a persistent local cache 108 that is periodically updated with downloads from the cloud 180 whenever the local process 106 contacts the DynamoDB cache 110. This local cache is persistent so long as the user has not disabled or cleared cookies and associated local data from web sites. Also, a time tag is recorded into the local cache 108 establishing the baseline time and date that the local cache 108 was created as well as a time tag whenever an update should occur.

In addition to downloading and maintaining the local cache 108, local process 106 maintains cognizance of significant actions by browser 103 in real time both to aid decision-making as well as record these actions in separate local cache archive(s) of recent user data 109 with separate time tags that are synchronized with the master time maintained by Collector 104. As with all local caches (108 and 109) maintained by this invention, all browser 103 local data are organized under a unique Muid value maintained locally (i.e., user 101) by the process 106.

Periodically, as determined by a priori scheduled uploads maintained by the local process 106 and Collector 104, local cache archive(s) 109 that contain new data are pushed by the local process 106 to the central site 102 Collector 104 and eventually to the Master Event database 107. Prior to insertion into the Master Event database 107 the Collector 104 reformats and cleanses the uploaded archival data 109 thereby ensuring seamless updating of the system wide Master Event database 107. Regularly, batch programs 111 run sorting and reducing the Master Event database 107 into user specific records that are then inserted into the central site 102 User database 105 time tagged and organized by Muid values. These User database 105 updates are then pushed to the DynamoDB cache 110 in the cloud 180 with the processed updates ultimately traveling full circle and pushed back to the multiplicities of user 101 local caches 108.

In additional to a priori periodically scheduled uploads, the user 101 local process 106 may detect a predefined local occurrence (e.g., purchase of item by user) occurring that may trigger it to notify the Collector 104 immediately in real time. When this occurs, the predefined local occurrence would be pushed to the central site 102 Collector 104 and ultimately to the Master Event database 107 and subsequent downstream databases and caches. Typically, any pending recent user data caches 109 would also be pushed to the Collector 104 at that time.

In addition to user 101 sourced data, batch processes 111 execute periodically on an a priori schedule or at a human administrator initiated requests that may also acquire ancillary sourced data (e.g., consumer subscription information) from other sources (e.g., web site 125) that can be merged into and/or used to further filter the Master Event database 107. These same periodically scheduled batch processes 111 may also review previously archived Master Event database 107 data for obsolescence (e.g., determining whether the archived data is still being referenced or determining if a searched for item was purchased) purging obsolete data when found.

Regardless of scheduled or spontaneous uploads, recent user data collected 109 by the local process 106 is transmitted from the user 101 to the central site 102 Collector 104 via the Internet whenever the local process 106 and Collector 104 connect. Once the Collector 104 receives the transmitted data, a special process in the Collector 104 reformats and cleanses the data and ultimately inserts the data into the central site 102 overall Master Event database 107 via an ingestion process. This ingestion process typically involves saving received candidate Master Event data in a transient database 129 (preferably Hadoop) maintaining the form of sequential log records based on the synchronized time of insertion. Also at the central site 102, batch processes 111 run periodically on an a priori schedule that sort and reduce and optionally obfuscate the processed Mather data into user specific records that are ultimately loaded onto the User database 105. Other ancillary data such as subscription information can be also merged or used to further filter the Master Event database 107 during scheduled batch processing or spontaneously when the ancillary data becomes available. The resulting refined Master Event database 107 typically being organized into sets of marketing segments with behavioral metrics and other specialized data that is then inserted into the high-performance User database 105. Subsets of User database 105 records are then synchronized with the DynamoDB cache 110 in the cloud 180.

When a web page is loaded from a web site's 125 web servers 126 onto the user's 101 browser 103, local process 106 attempts to access segment and behavioral data from cache memory—either via its local cache 108, local recent user data 109, or via the Internet to the DynamoDB cache 110. Keying for this access can be via Muid, and/or anonymous tracking cookie value (Duid), and/or hard user ID (Uid) assuming the user 101 is registered with the web site 125. Local process 106 then reviews the keyed data and, depending on the returned segment and behavioral response, executes specific actions. Such actions could be associating a user to an ad server's content 128 based on one or more segments, setting specific pay wall (i.e., metered content) 127 thresholds that had been previously ascertained based on user behavior, granting a limited viewing or prepaid, or determining if a product has been purchased, etc.

Additionally, the central site 102 Master Event 107 and User 105 databases can also be utilized to provide summary reports 112 of individual and overall user behavior via separate batch processes 111. These summary reports 112 can include overall summaries of various key parameters such as: popularity of pages, effectiveness of ads, revenue generated per type of user, active times for site usage, pricing preferences, etc. Summary reports 112 may be schedule to run periodically or spontaneously implemented upon request. Additionally, summary report 112 findings can be applied to driving decision making for both virtual (i.e., Internet) and real world (i.e., brick and mortar) pricing and other metrics.

As shown in general embodiment's 100 associated system architecture diagram 100' of FIG. 1B, the four functional components (i.e., user 101', central site 102', web site 125', and cloud 180') of the invention typically reside in separate servers (e.g., collector server 151, web site server 152, and cloud DynamoDB server 181) as well as other computing devices (such as the user's browser device 150) probably in different physical locations. Additionally, for simplicity throughout embodiment 100' of FIG. 1B, the three separate Internet interface buffers (175, 176, and 177) are illustrated as single nodes; however, as would be understood by one familiar in the art, each buffer (175, 176, or 177) is in reality a combination of various off-the-shelf Internet interfacing devices—e.g., switch, firewall, concentrator.

This physical distribution to different servers is preferable because the multiple databases and caches of the invention inherently can be optimized for different purposes allocating physical assets and bandwidth accordingly with all databases and caches coordinated through synchronized time tags as well as common Muid tags. For example, the multiplicities of user 101' local 108' and recent user data 109' caches distributed throughout the Internet would only require sufficient processing bandwidth to provide prompt responses to their associated user browser device's 150 Central Processing Unit (CPU) 155. However, cloud 180' DynamoDB cache 110' and its associated server 181 are required to be available to download to the multiplicities of local caches 108' across the Internet and consequently require significantly greater processing bandwidth. Additionally, summary report processing of the central site 102' Master Event 107' and User 105' databases enabled by external device 153 can be executed on regularly scheduled intervals and/or upon demand without fear of significantly impacting user 101' responsiveness.

In addition to providing an Internet interface to the user's browser device 150, buffer 175 also provides interfaces to any external sites providing functionality to embodiment 100'—e.g., web site 125, cloud 180, event database 107. As also illustrated in FIG. 1B, separate central site 102 computer(s) 153 may also be locally linked to the collector server 151 for running batch processes and overseeing operations or alternatively linked remotely via secure Internet connections.

As previously discussed, a unique Muid value is assigned by the central site to a user 101' the first time he or she visits a web site 125' supported by this invention. This assignment process is performed by the central site's 102' collector server 151 that includes a CPU 156 with sufficient memory 161 to contain all of the processes necessary to support the invention. The central site's 102' collector server 151 transmits the assigned Muid value along with an initial time stamp and update schedule via its buffer 175 through the cloud 180' and its associated buffer 177 to the user's browser device 150.

Once the process and ancillary data (e.g., Muid, time stamp, update schedule) are downloaded to the user's browser device 150 memory 160, the local process 106 (FIG. 1A) software application on the user's browser device 150 CPU 155 (FIG. 1B) or mobile application maintaining a persistent local cache 108' that is updated with downloads from the central site 102' whenever the user's browser device 150 contacts the Collector server 151 by a trigger event or periodically on scheduled updates. This local cache is persistent as long as the user has not disabled or cleared cookies and associated local data from web sites. In addition to downloading and maintaining the local cache 108', the local process 106 (FIG. 1A) software application executing in the user's browser device 150 memory 160 (FIG. 1B) maintains cognizance of significant actions taken by the user in real time, logging significant actions (e.g., logging first set(s) of electronic information) in separate recent user data archive(s) 109' that were garnered after the last local cache 108' download from the Collector server 151.

Data collected 109' by the local process 106 (FIG. 1A) executing in the user's browser device 150 (FIG. 1B) memory 160 is transmitted through the Internet to the Collector server 151 via the buffers 177 and 175 whenever the user's browser device 150 and Collector server 151 communicate. When the Collector server 151 receives newly transmitted data, a special process resident in its memory 161 reformats and cleanses the newly received data via an ingestion process. This ingestion process typically involves saving received candidate Master Event data in a transient database 129 (preferably Hadoop) maintaining the form of sequential log records based on the time of insertion. The resulting refined Master Event database 107' is then inserted into a high-performance User database 105'. In a preferred embodiment, the User database 105' is copied and stored in a cloud 180' web accessible random access cache known in the art as DynamoDB 110' hosted by Amazon 181 with its own CPU 158 and associated memory 163.

Like the central site 102', the web site 125' also would include its own Internet facing buffer 176 that is a combination of various off-the-shelf Internet interfacing devices—e.g., switch, firewall, concentrator. Web site 125' delivery is accomplished via a web site server 152 with its own CPU 157 and memory 162. Software application(s) resident on the web site 125' publisher's page compatible with this invention typically uses the following protocol:

A) Maintains a page view counter in browser local storage
B) When this counter reaches a threshold, the software application(s) resident on the web site 125' publisher's page sends a request to the DynamoDB server 181 including an anonymous user identifier (Duid) and an optional hard user identifier (Uid)
C) The DynamoDB server 181 then attempts to locate an associated user record, first by Uid and alternatively by Duid
D) Assuming the DynamoDB server 181 was able to locate a user record, it returns the found record, alternatively an error code is returned to the software application(s) resident on the web site 125' publisher's page.
E) The user record or error code is then passed to the user's 101' browser device 150. If no error code was returned the user's 101' browser device 150 stores the returned data in its persistent local cache 108'. Once a user record has been retrieved from the DynamoDB server 181 and stored in the browsers local cache 108', the browser device 150 utilizes the user record to perform one of several actions defined by ancillary data embedded in the returned user record. Examples of these actions are:
   i.) Execute a script that is stored in the user record
   ii.) Render a HTML5 image tag that is stored in the user record (a.k.a. "beacon pixel"—i.e., enables user recognition across multiple servers)
   iii.) Run paywall (i.e., restricted access) or other third party software application(s)
   iv.) Set and control the thresholds of a paywall meter
   v.) These actions are then repeated for each subsequent rendering of a 125' publisher's page
F) The image of the user record is then saved in the user's 101' browser device 150 recent user data 109' cache non-volatile memory.
G) Future access by the browser of the user record is accessed from the 109' cache non-volatile memory.

Thus, throughout the session established between the user's browser device 150 and the web site server 152 over the established electronic network various tracking cookies (Duid), the Muid, and possibly hard user ID (Uid) data are exchanged depending on the content accessed, user preferences and privileges, and other parameters—all ultimately contributing to access to the web content 165. As previously stated, this data is stored in the user's browser device 150 recent user cache memory 109' and ultimately passed onto the Collector server 151 for ingestion into the Master Event database 107'. Typically, a value in the user record indicates when the data needs to be refreshed by connecting the user's browser device 150 to the Collector server 151. Ideally, this refresh value is synchronized with the update schedule of the User database 105' periodic batch process cycle. Subsequent accesses to the DynamoDB server 181 to refresh the user record are performed using the Muid that was returned from the initial user record that was stored in the local cache. This improves response time by avoiding DynamoDB indexes associated with the Duid and Uid.

Alternatively and/or in addition to data being passed to the Collector server 151 directly from the user's browser device 150, it is also possible for the web site server 152 to pass similar data directly to the Collector server 151. This data exchange can be via the Internet or, in cases where the web site server 152 and Collector server 151 are physically collocated, via Local Area Network (LAN).

Additionally, various scheduled and unscheduled batch processes are run on the central site 102' Master Event database 107' as well as the User database 105' to provide summary reports of individual and overall user behavior. These batch processes can be controlled by a separate authorized user computer 153 over a LAN at the central site 102' or alternatively remotely over a secure Internet connection. Batch process reports could include overall summaries of various key parameters such as: popularity of pages, effectiveness of ads, revenue generated per type of user, active times for suite usage, etc.

Of course, as would be apparent to one skilled in the art in view of the present disclosure, there are numerous other permutations of segmentation of databases (e.g., the web site server 152 and Collector server 151 physically collocated, Master Event database 107' physically collocated with the Amazon Dynamic DB server 181, batch processing and report displays computer 153 interfacing to the collector server 151 via the Internet, etc.) that may under some circumstances be preferable to the disclosed embodiments. The significant point is that segregated databases achieve high efficiencies by maintaining a common Muid and time tags where the users' local cache databases 108 are dynamically augmented by locally derived metrics 109' with these relevant local metrics also periodically uploaded to a common Master Event database for various batch processes 111.

Figure 2:
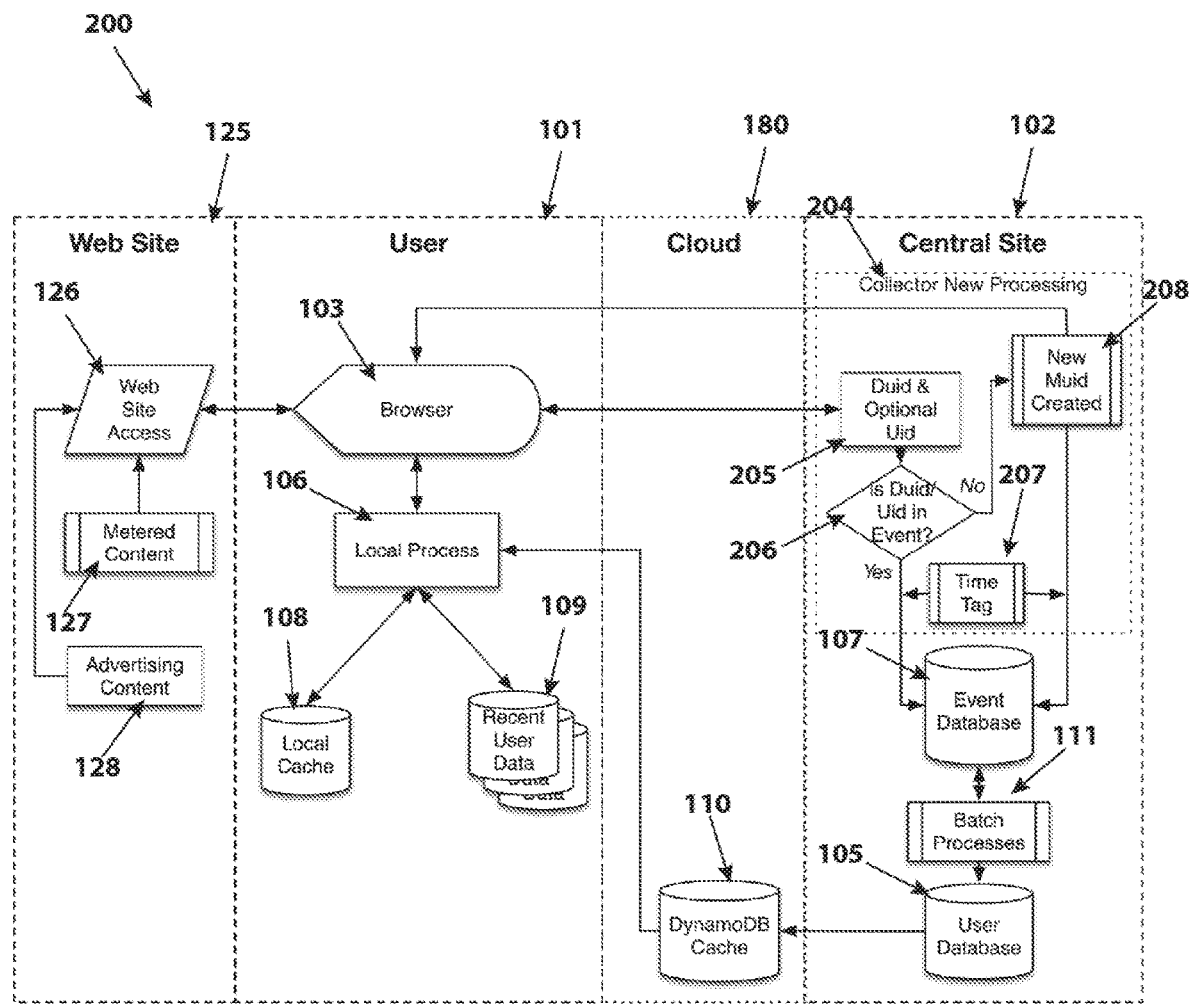
FIG. 2 is a swim lane flowchart providing a schematic graphical overview of assigning a common Muid code to a new user, which is compatible with the general embodiment of FIG. 1A and FIG. 1B.

With this general embodiment, it is apparent that assigning a common Muid code with synchronized time tags to new users across the distributed databases and memory is essential. FIG. 2 provides a swim lane flowchart overview 200 of assigning a common Muid code to new users as well as inserting a time tag into the users' 101 local cache 108 and Master Event database 107 entries. Whenever the Collector process 204 receives a Duid 205 along with an optional Uid 205 without an associated Muid from the web site 125 or users' 101 local process 106, the Collector 204 first attempts to locate the received Duid and optional Uid in the existing Master Event database 107. If a hit is found 206, the associated Muid is referenced with the new data entered 206 into the Master Event database 107 with a corresponding time tag 207. Conversely, if no existing record or associated Muid can be found 206 in the Master Event database 107, the Collector processing 204 creates a new Muid 208 by generating a random or pseudorandom 128-bit Universally Unique Identifier (UUID) string and transmitting to the local process 106 the newly minted Muid, a time tag, and a priori scheduled update date and time to the browser 103 that initiated the transfer. Additionally, a new record in the Master Event database 107 is recorded, populating it with the Muid, Duid, (optional) Uid, time tag 207, and any other relevant data.

Once the common Muid code is assigned, it is shared across the downstream databases by regular batch processes 111 that run sorting and reducing the Master Event database 107 into user specific records that are then inserted into the central site 102 User database 105 with the assigned time tagged organized by Muid values. These User database 105 updates are then pushed to the DynamoDB cache 110 in the cloud 180 with the processed updates ultimately pushed to the multiplicities of user 101 local caches 108.

Figure 3A:
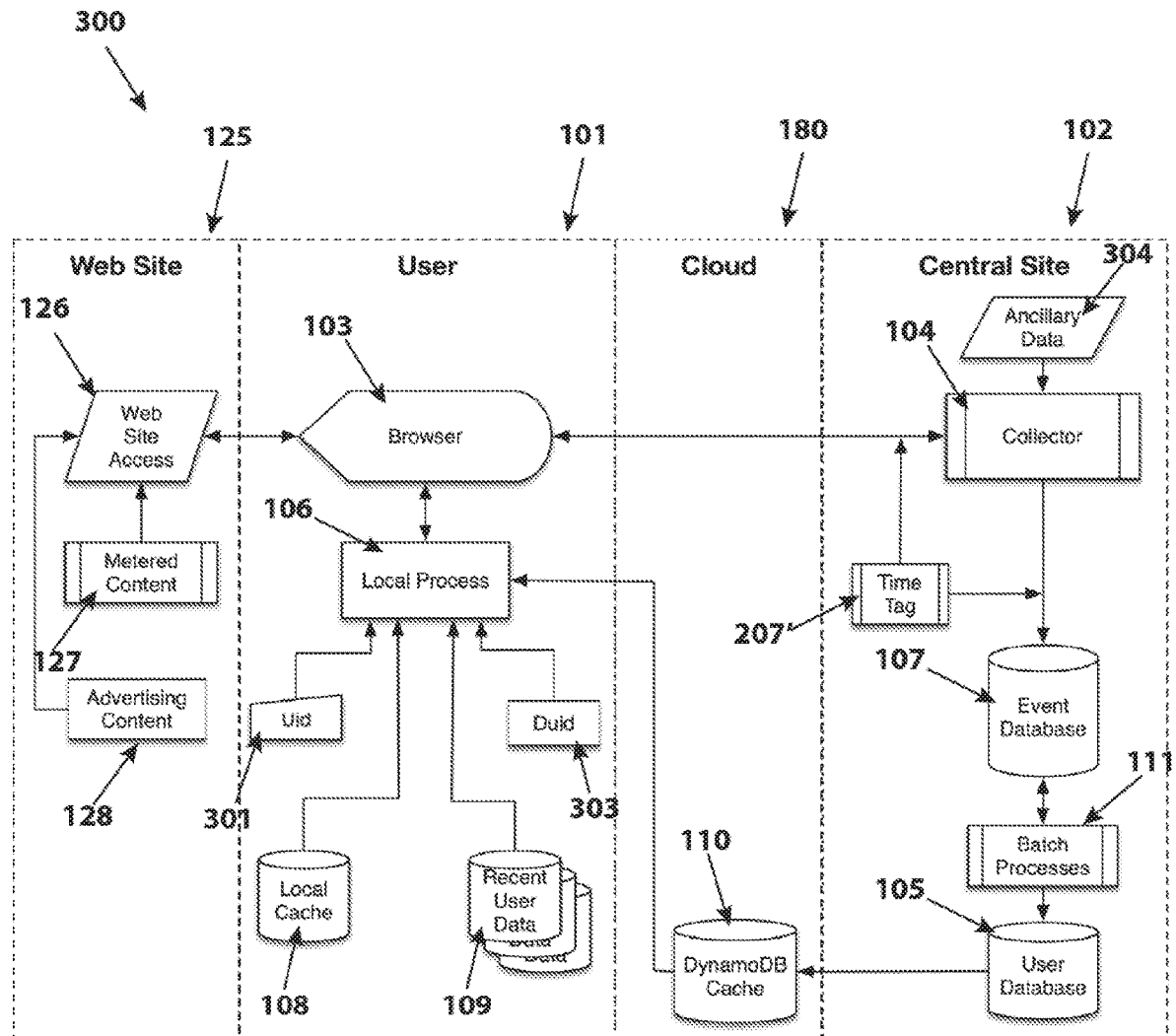
FIG. 3A is a swim lane flowchart providing a schematic graphical cross referencing of Duid and Uid values to a common Muid code, which is compatible with the embodiments of FIG. 1A, FIG. 1B, and FIG. 2.

As illustrated in FIG. 3A embodiment 300, initial and subsequent updates from the user 101 are pushed up to the central site 102 Collector 104 from the user 101 browser's 103 local process 106 that include the assigned Muid as well as any transactional Duid 303, optional Uid 301, and other salient information 109 that may have been stored locally at the User's 101 local process 106. These pushed updates are then time tagged 207' and inserted into the Master Event database 107. Whenever this connection occurs, the next scheduled update time is pushed from the central site 102 time tagging process 207' through the collector 104 back to the user's 101 browser 103, the local process 106, and ultimately to the non-volatile local cache 108. Thus, the Master Event database 107 and consequently the entire network of databases and caches are updated with current information.

The frequency that these updates are pushed downstream from the Master Event database 107 to the downstream databases (i.e., 105, 108, and 110) is determined by the batch processes 111 that frequently execute sorting and reducing the processed Master Event data 107 into user specific records that are ultimately loaded onto the User database 105. Other ancillary data 304 such as subscription information can be also merged or used to further filter the Master Event database 107 during scheduled batch processing or spontaneously when the ancillary data becomes available. The resulting refined Master Event database 107 typically being organized into sets of marketing segments with behavioral metrics and other specialized data that is then inserted into the high-performance User database 105. Subsets of User database 105 records are then synchronized with the DynamoDB cache 110 in the cloud 180 and ultimately to the various users' 101 local caches 108.

In a preferred embodiment, the User database 105 is exported to the DynamoDB 110 in a CSV (Comma-Separated Values) file format. FIG. 3B table 320 illustrates a first representative example of a two-dimensional graphic illustration of the table structure of the CSV file format exported from the User database 105 to the DynamoDB 110. As illustrated, table 320 consists of plain text ASCII (American Standard Code for Information Interchange) characters, consisting of one record per line (330 and 331), with the records divided into fields (321 through 326) separated by ASCII character comma delimiters (i.e., ","), with every record having six fields (columns). The first field 321, provides a sequential numerical assignment for that line—e.g., "1" for record 330, "2" for record 331. The second field 322, provides the name of a given segment—e.g., "NEWS6_NONSUB" for record 330, "COWBOYS3_NONSUB" for record 331. The third field 323, provides the type—e.g., "script" for both records 330 and 331. The type field 323 controlling what action the browser 103 (FIG. 3A) will perform for the record's defined segment 322 (FIG. 3B), such as executing a script or rendering an image tag. The fourth field 324, provides the tag data—e.g., "https://www.wsj.com/articles/snap-goes-the-market-1488413442" for record 330, "https://i.simpli.fi/dpx.js?cid=58786&action=100&segment=tbtsimplifione&m=1&sifi_t uid=32395" for record 331. In this embodiment, the tag data 324 specifies the value (if any) that will be executed by the type field 323. The fifth field 325, sets the meter limit (if any)—e.g., "0" for record 330, "0x1FE42" for record 331. The meter limit field 325 optionally allows the system to specify the point where a paywall meter will block the user's access to the content specified by the segment field 322. Finally, the sixth field 326, specifies whether the paywall meter should be reset when the file is read by the browser with a "0" specifying no reset and a "1" forcing a reset when the record is actuated—e.g., "0" for record 330, "1" for record 331.

Returning to FIG. 3A, when the DynamoDB cache 110 receives the CSV file exported from the User database 105, the CSV file is processed with the resulting information stored in the DynamoDB NoSQL ("not only SQL" where "SQL" refers to "Structured Query Language") cache 110 In the context of this invention, the DynamoDB NoSQL 110 saved user data as well as other associated data that is organized by Duid is referred to as the "Muid record." This downloaded Muid record resides on the DynamoDB (NoSQL) cache 110 until the user's 101 browser's 103 local process 106 connects with the DynamoDB cache 110. At that point, the Muid record is transferred and saved in the browser's 103 local cache 108. FIG. 3C provides a representative example 350 of a Muid record snippet that is fetched by web browser's 103 (FIG. 3A) local process 106.

As shown in the FIG. 3C example 350, the Muid record that is fetched by the web browser 103 (FIG. 3A) local process 106 is typically transmitted in JSON (JavaScript Object Notation) format. This Muid record 350 (FIG. 3C) consists of various fields, including some of the fields that were previously imported into the DynamoDB 110 (FIG. 3A) as a CSV file. The four fields illustrated in the example 350 (FIG. 3C) are: "Duid" 351, "segments" 352, "updateTS" 356, and "Muid" 357. The Duid 351 field contains the user's anonymous identification derived from a browser tracking cookie and acts as an alternate key to the Muid 357 field, which also contains an alternate key based on the User Id (Uid). The segments 352 field is an array of segment data associated with the current user and in the example of 350 consists of data derived from CSV file record 331 (FIG. 3B)—i.e.,

- the "name" 353 of the segment
- the segment's "type" 354 that is used by the local process 106 (FIG. 3A) to determine how to process the segment—e.g., executing the script contained in the "tag" 355 field (FIG. 3C)
- the segment's "tag" 355 field, which is a script or image code that is executed by the browser's 103 local process 106 (FIG. 3A)

The "updateTS" 356 field (FIG. 3C) specifies the timestamp when the browser's 103 local process 106 (FIG. 3A) should update by connecting with the DynamoDB 110 server. Finally, the "Muid" field (FIG. 3C) provides the Mather User ID, which is the primary key of the invention.

Once the Muid record is transferred it is saved in the browser's 103 local cache 108 (FIG. 3A). FIG. 3D provides a representative example 375 of a snippet stored in the browser's 103 local cache 108 (FIG. 3A) saved in HTML5 format. As shown in the FIG. 3D example 375, the saved snippet includes four new fields:

- "pageViews" 376—the total number of pages that this user has viewed from the current browser. This is used to control when an initial fetch is performed by the DynamoDB 110 server (FIG. 3A) to eliminate "flyby" users which are users that only view one or two pages.
- "nextUpdate" 377 (FIG. 3D)—the time interval until the next scheduled User Database 105 (FIG. 3A) occurs
- "nextUpdateTS" 378 (FIG. 3D)—the time stamp to perform the next update with the DynamoDB 110 server (FIG. 3A).
- "userDBFetch" 379 (FIG. 3D)—whether a DynamoDB 110 server (FIG. 3A) fetch has been performed In addition to the four new fields FIG. 3D example 375 also stores migrated data from the Muid record and other sources. The Uid 380 in conjunction with the Duid 381 and Muid 389 provide unique reference identifiers for the entire system. Like before, the updateTS 382 field specifies the timestamp when the browser's 103 local process 106 (FIG. 3A) should update by connecting with the DynamoDB 110 server. Finally, the segments field 383 (FIG. 3D) and its associated array 384 through 388 of segment data associated with the current user is also saved in the browser's 103 local cache 108 (FIG. 3A).

Figure 4:
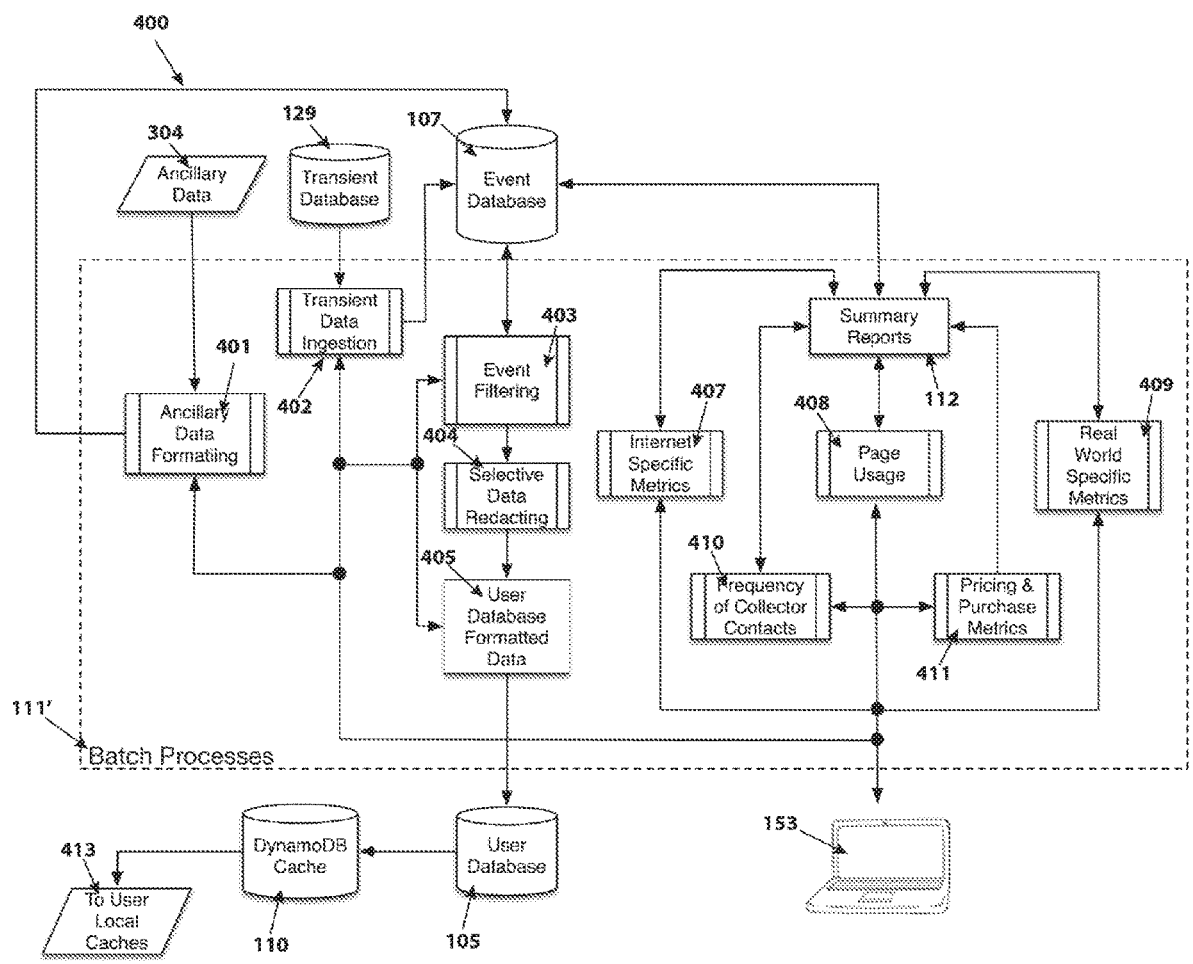
FIG. 4 is a flowchart providing a schematic graphical overview of batch processing of the refined Master Event database, which is compatible with the embodiments of FIG. 1A, FIG. 1B, FIG. 2, and FIG. 3A.

Aside from adding ancillary data and pushing updates to downstream databases, batch processing also determines reports that can be used for various Internet sites as well as in the physical (i.e., brick and mortar) world. FIG. 4 provides an overview flowchart 400 of most types of key batch processes as utilized by this invention. As shown in FIG. 4, batch processing 111' includes the ingestion process 402 reformatting and cleansing the received data temporarily stored in the transient database 129 prior to inserting the cleansed and formatted data into the global Master Event database 107 under assigned Muid records. Periodically, on an a priori schedule, other batch processes filter 403 the Master Event data 107 (optionally) redacting 404 user sensitive data (e.g., credit card numbers) creating user specific records 405 that are ultimately loaded onto the User database 105. These same user specific records 405 are also available for other offline batch processes—e.g., 407 thru 411.

Batch processes 111' embodiments also reformat and filter 401 ancillary data 304 (e.g., subscription information, geo-location, credit reports, OFAC or "Office of Foreign Asset Control" checks) obtained from third party data sources other than the users browsers and ultimately insert the refined ancillary data into the Master Event database 107. These batch processes 111' may be scheduled or alternatively run spontaneously when the ancillary data 304 becomes available. This formatted 401 ancillary data 304 may also be used to dynamically filter 403 the Master Event database 107 entries without necessarily being added to the database 107 itself.

The batch process 111' embodiment filtered 403 and optionally redacted 404 Master Event database 107 is typically organized into sets of marketing segments with behavioral metrics and other specialized data inserted into the high-performance User database 105. Subsets of User database 105 records are then synchronized with the DynamoDB cache 110 and further downstream 413 to the various local user caches.

Aside from input data processing and filtering, batch processes 111' embodiments are used to generate various summary reports 112 from the global Master Event database 107 and User formatted data 405. These summary reports 112 may be embodied as machine-readable metrics 407 intended for aiding filtering of data or for additional global data summaries that may be fed into the database stream of this invention or other automated interfaces. Alternatively, summary reports may be formatted for human readable consumption 409 providing overall averages of: CLV, market based pricing and elasticity, groups of customers specified pricing recommendations or ranges, subscription pricing, etc. Of course, machine-readable metrics 407 may also be generated for other automated real world applications that are on the Internet (e.g., web page source providers) as well as not necessarily on the Internet or an integral part of this invention. Examples of machine-readable metrics 407 applied to customized real world goods and services are: newspaper or magazine subscription pricing, customized newspaper or magazine content, customized travel package offerings, elective surgery pricing, etc. Regardless of whether the summary reports 112 are machine-readable 407 or human readable 409 metrics, report generation and output is preferably controlled from an external computing station 153—thereby maximizing flexibility.

Finally, this invention includes various batch processing embodiments that produce both machine and human readable summary reports 112 that execute automatically on a periodic basis. These summary reports 112 analyze both the global Master Event database 107 as well as User database data 405 to derive common metrics such as frequency of connection to the central site 410, page usage 408, and actual items purchased with the associated purchase price 411.

Figure 5:
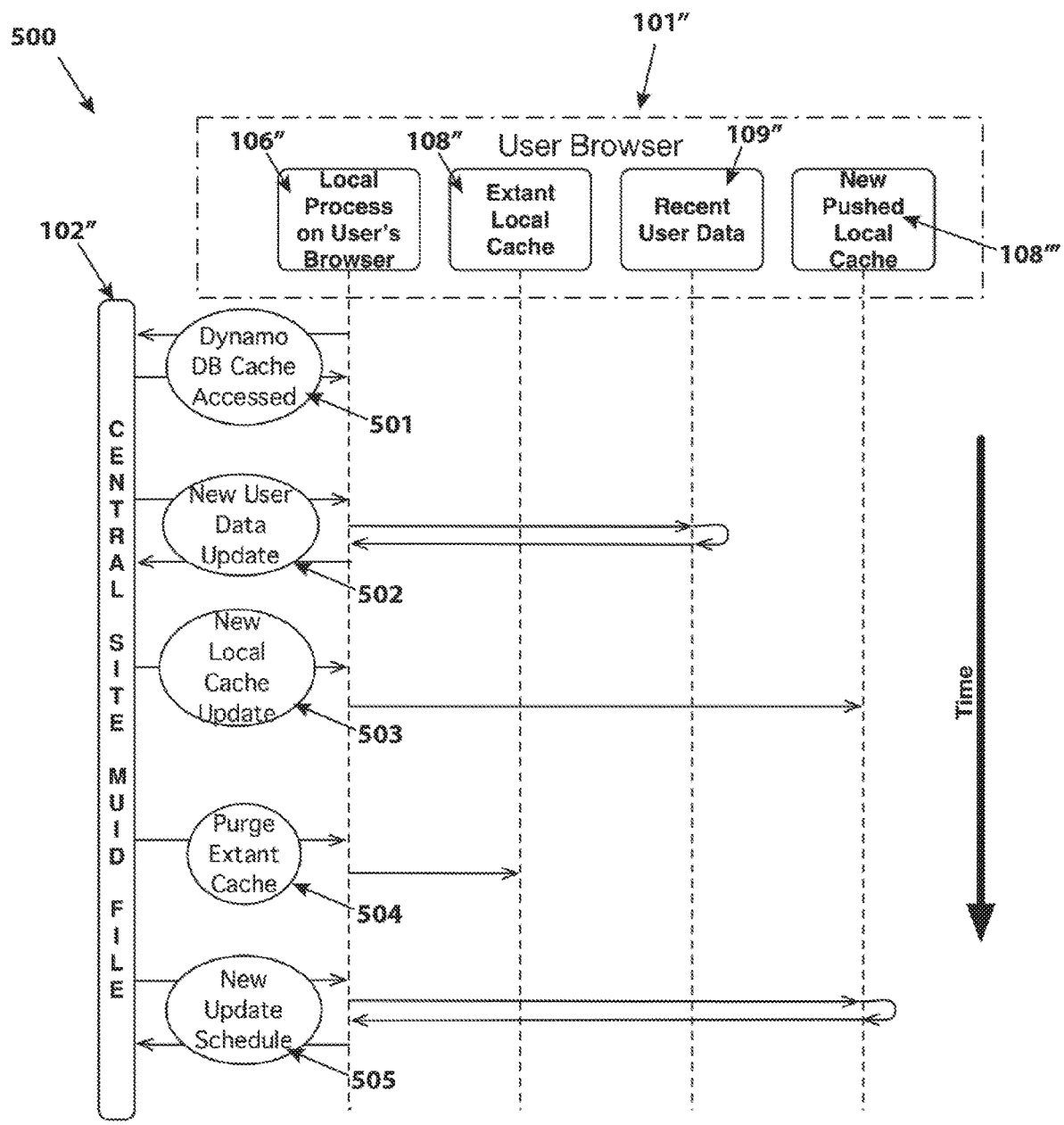
FIG. 5 is a coordinated two-dimensional timeline illustrating the interactions of a local cache update with respect to the central site, which is compatible with the general embodiment of FIG. 1A, FIG. 1B, FIG. 2, FIG. 3A, and FIG. 4; and, FIG. 6 is a swim lane flowchart providing a schematic graphical overview of the user's local browser utilizing both the downloaded Master Event database local cache and subsequent user data to determine real time access and advertising, which is compatible with the embodiments of FIG. 1A and FIG. 1B.

FIG. 5 illustrates a two-dimensional timeline 500 diagrammatically illustrating how information processed by this invention is partitioned and updated relative to the user's browser 101" and the central site 102" with respect to time. In FIG. 5, time flows from top to bottom with the various entities 106", 108", 109", and 108''' in the user's browser 101" illustrated as column headers in a horizontal row across the top of 500 and the central site 102" shown vertically on the left-hand side of 500.

At the top of timeline 500, the entire data exchange is shown starting with the local process 106" on the user's browser 101" requesting access to the central site 102" via the Dynamo DB cache 501. When this occurs, the central site 102" immediately responds to the request 501 regardless of whether the initial request 501 from the local process 106" was for a scheduled local cache update or not, the central site 102" automatically requests that any new updates from the user's browser 101" recent user data cache(s) 109" be transmitted to it 502 at that time. After recent user data cache(s) 109" update data has been received 502 by the central site 102", the central site 102" pushes 503 a new composite local cache update 108''' to the user's browser 101" that will replace the extant local cache 108" that has been maintained on the user's browser 101". As soon as the local cache update 108''' has been successfully received 503 by the user's browser 101", the extant local cache 108" resident on the user's browser non-volatile memory is deleted 504 with the new pushed local cache 108''' replacing the now deleted extant cache 108". Finally, after the pushed local cache update 108''' is complete, the central site 102" transmits a new schedule update 505 to the user's browser 101" thereby specifying the maximum amount of time that would expire before the next update to the user's browser local cache 108".

Thus, with adaptive fine-tuning of scheduled updates that are cognizant of the frequency the user's browser 101" contacts the central site 102" independent of scheduled updates, the local cache can be refreshed sufficiently to support timely global summary reports 112 (FIG. 4) as well as greatly mitigating the problem of "sticky advertising." Naturally, there is an inherent trade-off between frequency of updates and unduly burdening the user's browser 101" (FIG. 5) bandwidth. However, by dynamically monitoring and maintaining metrics 410 (FIG. 4) via batch processing 111' whenever the user's browser 101" (FIG. 5) contacts the central site 102", this invention can automatically seek an optimal balance between freshness of data and bandwidth utilization. By also providing human readable global summary reports 112 (FIG. 4), this automated tuning process can also be refined over time with human input 153.

While the two-dimensional timeline 500 of FIG. 5 diagrammatically illustrates the mechanics of updating the user's browser 101" local cache 108" via scheduled or spontaneous contacts with the central site 102", it does not convey the nature of the data exchanged nor how the local process 106" on the user's browser 101" independently adapts to situations as they arise. Referring to FIG. 1A, as new behavioral metrics are accumulated in the user's 101 local recent user data cache 109, logic is created in either the local process 106 or via batch processes 111 at the central site 102 when the data is eventually uploaded to the Master Event database 107.

For example, local process 106 logic may be created that monitors the number of pages visited and their types. If some a priori threshold of a specific type of page (e.g., "sports", "car racing") visits is exceeded, a segment will be created in the local recent user data cache 109 denoting the user's preference. Over time, portions of these saved segments may be logically "AND" or "OR" together to create customized experiences for the user—e.g., updates on specific sporting events like "Formula-1"; advertisement selection not derived from search requests, but from user tastes; customized news content. When these saved segments are uploaded to the global Master Event database 107, batch processes may review the logical segments and associated metrics and apply business rules to develop higher level logic covering access and other business related functions— e.g., metered content page charges may be automatically waived if the user has shown sufficient interest in a particular topic and is deemed financially able to purchase an item that would be advertised in conjunction with the metered content page.

Logic running in the local process 106 may also be cognizant of different data metric types and consequently process different data metric types differently. For example, some user behavioral data metrics are relatively or completely static (e.g., CLV, home address, telephone number, last four social security digits), while other data metrics are dynamic (e.g., medical conditions, recently watched television programs, vacation destinations) and other data metrics are moderately stable (e.g., child's grade level at school, type of car owned, seasonal activity). The local process 106 logic may be programmed to save new static and moderately stable data in its local recent user data cache and contact the collector 104 immediately if a new dynamic data metric is encountered. This type of logic can, in a preferred embodiment, be expanded to flag specific user events for immediate uploading to the collector 104 regardless of the data metric's dynamic type—e.g., car information (normally moderately stable) may be uploaded immediately if a car search was recently conducted on a car site.

This same concept of cognizance of different data metric types can be extended to batch processing 111 on the central site 102 with segments generated from ancillary data 304 (FIG. 3A) or data metrics from other web sites 125 (FIG. 1A). In this embodiment, apparently disparate data segments from different sources can be linked together to reach global conclusions—e.g., a searched for item has been purchased. In a preferred embodiment, linking of some segments together may cause the central site collector 104 to instruct all participating web sites 125 to push a "phone home" (i.e., contact the Collector 104) instruction to a user's 101 local process 106 when a specific Muid was detected, thereby providing timely global updates to the local cache 108 when merited. Thus, the preferred and previous data metric type cognizant processing also helps to mitigate "sticky advertising."

Cognizance of data metric types across multiple platforms is also enabled by this invention. In another preferred embodiment the synchronization of multiplicities of high-speed databases and caches with subsets or abstractions of the common Master Event database and Muid enable information exchange and summations from multiple Internet sites or sources to form summary conclusions that would not have been possible with prior art cookie and tracking paradigms. Multiplicities of visits to different sites where the user has a common Muid recognized allow for a common identification without necessarily compromising the user's individual identity. This compilation of identical and differing metric types from various sites allow for a more global view of user behavior that can be utilized to better determine the user's CLV. For example, assume a given user with a common Muid has visited multiple sites; however, throughout all the tracked sites visited by the user, the common Muid reveals that zero advertisements have been viewed during that time period. This compilation strongly implies that the user has employed some form of "ad blocker" software application that eliminates advertisements from the user's experience. This conclusion reduces the user linked to the Muid value to the sites visited and consequentially his or hers' CLV thereby resulting in potentially restricted access and other consequences as a result.

Figure 6:
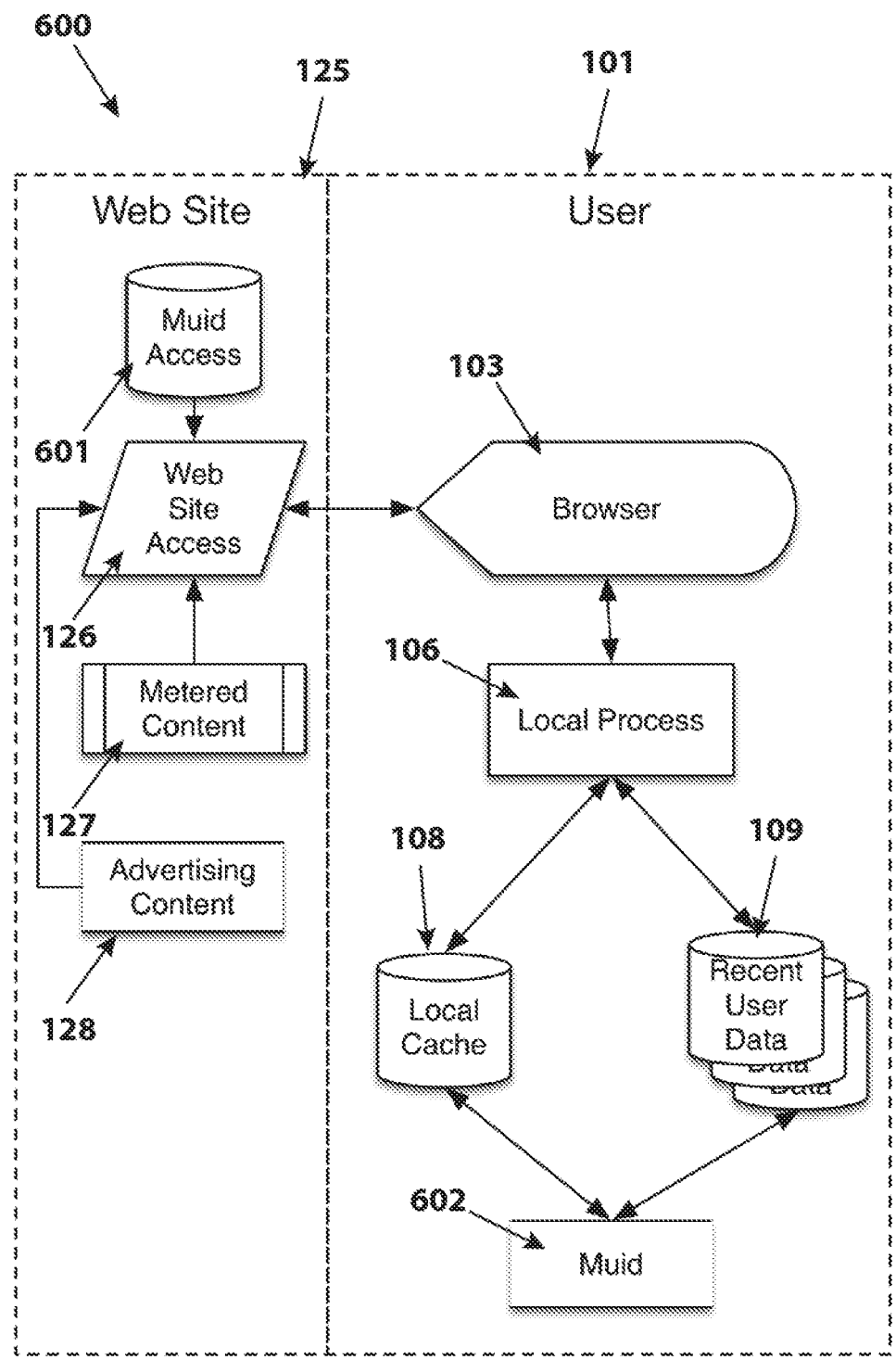

These types of data segment processing and cognizance are especially helpful in determining access to metered web site content—i.e., access to specific pages that may require payment or some form of special authorization. FIG. 6 illustrates one embodiment 600 of metering page views within the present invention. As shown in the figure, the user's 101 browser 103 connects to the web site 125 as previously described. During this session, the browser 103 attempts to access a metered page on the web site and consequently encounters a pay wall 127 (which is actually a form of computer code executing on the remote server) blocking immediate access to the secured content. The pay wall process 127 then queries to determine if the user 101 has an existing Muid 602. If a Muid is detected, the pay wall 127 subsequently queries its own local database 601 to find a matching Muid entry and any business rules associated with the Muid. These business rules (ideally determined by batch processes performed on the Master Event database 107—FIG. 1A) may stipulate that the user 101 (FIG. 6) should be charged "X" for this particular page view given the user's 101 recent history or alternatively the metered content fee should be waived if the user views a particular advertisement 128 in its entirety. Thus, the user's displayed container is controlled or modified based on previously accrued behavior data maintained by the Muid. Of course, there are many other embodiments and examples for determining pay wall access that are within the scope of this invention, the essential concept being that both browser 103 local data 108 and 109 as well as global data are used to determine business rules that dynamically authorize pay wall access.

FIG. 7 is a flowchart of the process described above, in accordance with one preferred embodiment of the present invention, and shows the following steps:

STEP 701: Log a first set of electronic information to a remotely located data store, including a user identifier, primary content, secondary content, and user interaction with the primary content and the secondary content.

STEP 702: Receive a second set of electronic information from a data source other than the user device, the second set of electronic information being related to the same user identifier as the user identifier of the first set of electronic information.

STEP 703: Create behavioral data for the user identifier based on at least the logged first set of electronic information and the second set of electronic information.

STEP 704: Control or modify a subsequently displayed container based on the behavioral data.

The present invention may be implemented with any combination of hardware and software. If implemented as a computer-implemented apparatus, the present invention is implemented using means for performing all of the steps and functions described above.

When implemented in software, the software code (computer code) for the various servers described above can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code (computer code) stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein for the above-described servers may be embodied in any of a number of forms, such as a rack-mounted computer or a desktop computer.

The databases described above may be interconnected with the servers by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It should be appreciated by those skilled in the art in view of this description that various modifications and variations may be made present invention without departing from the scope and spirit of the invention. It is intended that the present invention include such modifications and variations as come within the scope of the appended claims.

What is claimed is:

1. A system for using a plurality of different data sources to control displayed content, one of the data sources being related to electronic information presented to a user on a display of a user device via a software application that receives the electronic information from an electronic network, the display being a container of (i) primary content rendered from a content provider, and (ii) secondary content, at least a portion of the secondary content provided from a source other than the content provider, the system comprising:
   (a) a remotely located server including:
      (i) a data store containing the plurality of data sources, and
      (ii) ancillary data that is at least partially derived from a third party data source other than the user device;
   (b) computer code executing on a processor of the user device configured to log a first set of electronic information to the remotely located data store, the first set of electronic information including electronic information that identifies or indicates:
      (i) a user identifier,
      (ii) the primary content,
      (iii) the secondary content, and
      (iv) user interaction with the primary content and the secondary content;
   (c) a local cache in the user device configured to:
      (i) receive updates of the ancillary data from the remotely located server, and
      (ii) maintain metrics of local user activity, at least a portion of the metrics of local activity being used for making user data updates to the remotely located server;
   (d) computer code executing on the processor of the remotely located server configured to instruct the user device to change the time period until a next scheduled local cache update occurs based, in part, on the user data updates provided by the user's browser when the user's browser contacts the remotely located server based on a currently scheduled local cache update, thereby providing dynamic scheduling of the local cache updates via the change in the time period;
   (e) computer code executing on a processor of the remote server configured to receive the ancillary data, wherein a user identifier is associated with the ancillary data, the user identifier associated with the ancillary data being related to the same user identifier of the first set of electronic information;
   (f) computer code executing on the processor of the remote server configured to create behavioral data for the user identifier based on at least the logged first set of electronic information and the ancillary data;
   (g) computer code executing on the processors of the user device and remote server configured to control or modify a subsequently displayed container based on the behavioral data; and
   (h) computer code executing on the processors of the user device and remote server configured to use a paywall to control access to the primary content in the subsequently displayed container, the paywall including a set of rules that are defined based on at least the ancillary data.

2. The system of claim 1 wherein the secondary content includes internet advertising.

3. The system of claim 1 wherein the primary content includes news content.

4. The system of claim 1 further comprising:
   (i) computer code executing on the processor of the remote server configured to define an upload schedule for logging the first set of electronic information to the remotely located data store.

5. The system of claim 1 wherein the user identifier associated with the first set of electronic information and a user identifier associated with the ancillary data are different user identifiers, the system further comprising:
   (i) computer code executing on the processor of the remote server configured to use a device graph to correlate the user identifiers to a common user.

6. The system of claim 1 wherein the computer code executing on the processor of the user device is a scripting language.

7. The system of claim 1 wherein the software application is a browser.

8. The system of claim 1 wherein the software application is a mobile app.

9. A method for using a plurality of different data sources to control displayed content, one of the data sources being related to electronic information presented to a user on a display of a user device via a software application that receives the electronic information from an electronic network, the display being a container of (i) primary content rendered from a content provider, and (ii) secondary content, at least a portion of the secondary content provided from a source other than the content provider, the method comprising:
   (a) providing a remotely located server including:
      (i) a data store containing the plurality of data sources, and
      (ii) ancillary data that is at least partially derived from a third party data source other than the user device;
   (b) logging a first set of electronic information to the remotely located data store using computer code executing on a processor of the user device, the first set of electronic information including electronic information that identifies or indicates:
      (i) a user identifier,
      (ii) the primary content,
      (iii) the secondary content, and
      (iv) user interaction with the primary content and the secondary content;

(c) providing a local cache in the user device configured to:
  (i) receive updates of the ancillary data from the remotely located server, and
  (ii) maintain metrics of local user activity, at least a portion of the metrics of local activity being used for making user data updates to the remotely located server;
(d) instructing the user device, using computer code executing on the processor of the remotely located server, to change the time period until a next scheduled local cache update occurs based, in part, on the user data updates provided by the user's browser when the user's browser contacts the remotely located server based on a currently scheduled local cache update, thereby providing dynamic scheduling of the local cache updates via the change in the time period;
(e) receiving the ancillary data using computer code executing on a processor of the remote server, wherein a user identifier is associated with the ancillary data, the user identifier associated with the ancillary data being related to the same user identifier of the first set of electronic information;
(f) creating behavioral data, using computer code executing on the processor of the remote server, for the user identifier based on at least the logged first set of electronic information and the ancillary data;
(g) controlling or modifying a subsequently displayed container based on the behavioral data using computer code executing on the processors of the user device and remote server; and
(h) using a paywall to control access to the primary content in the subsequently displayed container, using computer code executing on the processors of the user device and remote server, the paywall including a set of rules that are defined based on at least the ancillary data.

10. The method of claim 9 wherein the secondary content includes internet advertising.

11. The method of claim 9 wherein the primary content includes news content.

12. The method of claim 9 further comprising:
  (i) defining an upload schedule for logging the first set of electronic information to the remotely located data store, using the computer code executing on the processor of the remote server.

13. The method of claim 9 wherein the user identifier associated with the first set of electronic information and a user identifier associated with the ancillary data are different user identifiers, the method further comprising:
  (i) using a device graph, using the computer code executing on the processor of the remote server, to correlate the user identifiers to a common user.

14. The method of claim 9 wherein the computer code executing on the processor of the user device is a scripting language.

15. The method of claim 9 wherein the software application is a browser.

16. The method of claim 9 wherein the software application is a mobile app.

* * * * *